INVENTOR
René BEGUIN
By John B. Hemmentrad
Attorney

June 6, 1961

R. BEGUIN 2,987,716

APPARATUS FOR CONVERTING DIGITAL SIGNALS INTO ANALOGICAL MOVEMENTS, WITH POWER AMPLIFICATION

Filed April 16, 1958

INVENTOR
René BEGUIN
By John B. Summerhow
Attorney

Ｕnited States Patent Office 2,987,716
Patented June 6, 1961

2,987,716
APPARATUS FOR CONVERTING DIGITAL SIGNALS INTO ANALOGICAL MOVEMENTS, WITH POWER AMPLIFICATION
René Beguin, Geneva, Switzerland, assignor to Mefina S.A., Fribourg, Switzerland
Filed Apr. 16, 1958, Ser. No. 729,021
Claims priority, application Switzerland May 9, 1957
6 Claims. (Cl. 340—347)

The present invention relates to an apparatus for converting digital signals into corresponding mechanical displacements.

An embodiment of the apparatus is characterised by a rotative shaft arranged to be connected to a source of continuous drive and includes a series of eccentrics driven with said shaft and each having a double-armed lever pivotally mounted thereon and driving a series of pairs of rocking levers pivotally mounted on a second shaft, pairs of the rocking levers being controlled by the double-armed levers through links connecting their ends, and by electromagnets controlled by digital signals and serving to lock or release the said levers in such manner that at least one of the levers of each pair remains free, for rotating a corresponding element of a series of rotatable and axially movable elements to alter the overall length dimension of the series of elements in accordance with the control of the electromagnets.

A constructional form of the subject of the invention is illustrated by way of example in the accompanying drawings.

Figure 1:
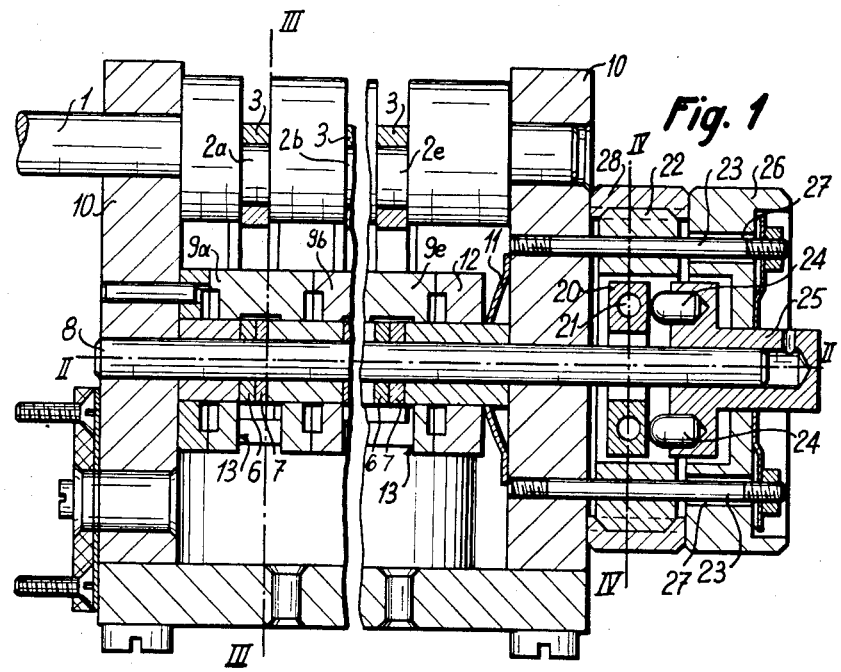
FIGURE 1 is a view in elevation and partially in section of the apparatus.
Figure 2:
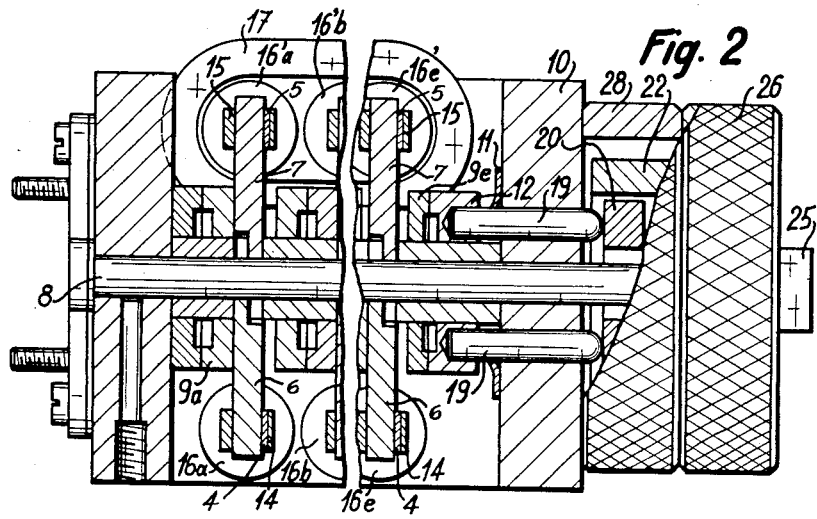
FIGURE 2 is a section along the line II—II of FIGURE 1.
Figure 3:
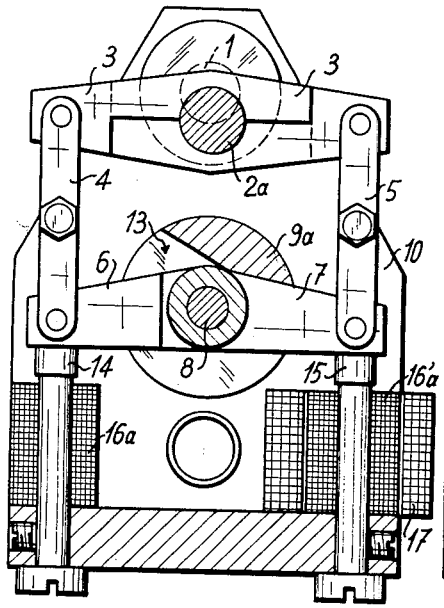
FIGURE 3 is a section along the line III—III of FIGURE 1.
Figure 4:
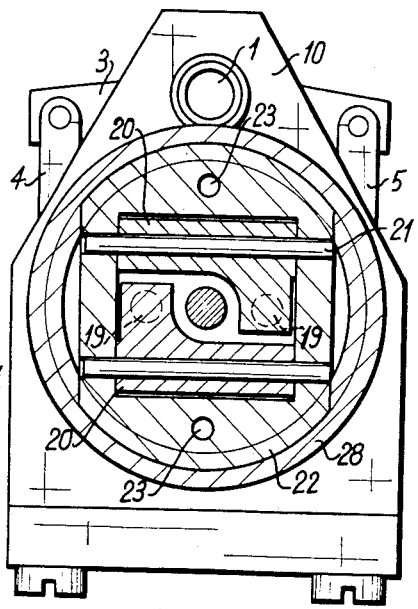
FIGURE 4 is a section along the line IV—IV of FIGURE 1.

The illustrated apparatus comprises a shaft 1 arranged to be connected to a drive motor, not shown. Mounted on the said shaft is a series of five eccentrics 2a to 2e, each of which has pivotally connected to its centre a double-armed lever 3, to the ends of which there are pivotally connected two links 4 and 5 (FIGURE 3). The link 4 is in turn pivotally connected to a lever 6, while the link 5 is pivotally connected to a lever 7, these two levers both being pivotally connected to a shaft 8, parallel to the shaft 1. Mounted on the shaft 8 is a series of five drum-type cams designated by 9a to 9e, which are axially movable and are maintained one against the other, the cam 9a bearing against the frame 10 of the apparatus through a spring 11 formed of a cambered annulus (FIGURES 1 and 2). The said spring is disposed between an annulus 12 applied against the cam 9e and the frame 10 of the apparatus. Each cam 9 is formed with a radial internal recess 13, into which there pass the ends of the levers 6 and 7. The latter support, at their opposite ends, a stud 14, 15 (FIGURE 3) situated above an electromagnet. The mechanism comprises five electromagnets 16a to 16e situated below the studs 14, and five electromagnets 16'a to 16'e situated below the studs 15. The coils of the electromagnets 16' are in addition surrounded by a continuously fed common winding 17. The coils 16 and 16' are connected in series. Consequently, when they are not fed, the studs 15 are continuously attracted against the cores of the electromagnet 16' by the current flowing through the common winding 17. When current is passed into the windings 16 and 16', the windings 16 attract the studs 14, and the studs 15 are released, the windings 16' being so arranged that the magnetisation which they produce in the corresponding core is opposed to the magnetisation produced by the common winding 17, thus neutralising the effect of the latter. The digital signals which the apparatus is to convert into mechanical displacements are applied to the various windings of the electromagnets in the form of impulses.

The rotation of the shaft 1 produces the rocking of the levers 6 and 7 through the eccentric 2, the levers 3 and the links 4 and 5. When the studs 14 are attracted by the electromagnets 16a to 16e, while the studs 15 are free, the levers 6 are maintained stationary and only the levers 7 rock. On the other hand, when the studs 15 are attracted, while the studs 14 are free, the levers 7 are maintained stationary and it is the levers 6 which rock. There correspond to these two functions two different angular positions of the cams 9a to 9e, since the levers 6 and 7 abut the base of the internal recesses 13 in the said cams and move them angularly. The angular position of the cam 9a as illustrated in FIGURE 3 corresponds to the case where the lever 6 is rocking, the lever 7 being held fast.

Figure 5:
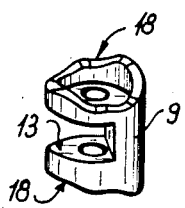
FIGURE 5 is a view in perspective of a detail.

The cams 9 (FIGURE 5) being of the drum type and having a cam surface 18 on each edge, they are axially displaced on the shaft 8 in accordance with the angular position which they occupy. Consequently, the axial position of the annulus 12 subjected to the action of the set of cams 9 depends upon the position of each of them. The mechanism described and illustrated thus effects on the one hand the conversion of the electric signals applied to the electromagnets into mechanical displacements, and on the other hand the addition of these mechanical displacements in accordance with a binary arithmetical system. In addition, it is to be noted that the power necessary for producing these mechanical displacements is supplied by the shaft 1, that is to say, from a source of continuous and independent energy.

The movements of the annulus 12 are transmitted to two push rods 19 sliding in the frame 10 of the apparatus and each bearing against an abutment member 20 pivotally mounted on a ring 22 at 21. The latter is prevented from turning by two rods 23 extending therethrough and screwed in the frame 10. The bearing members 20 act on two push rods 24 supported by a sleeve 25 sliding on the shaft 8. The angular position of the said sleeve may be varied with the aid of a knurled hand wheel 26, through which there extends the sleeve 25 of square cross-section and which is formed with apertures 27 in the form of an arc of a circle, through which apertures there extend the rods 23, whereby its angular movements are limited. By rotation of the sleeve 25 with the aid of the hand wheel 26, the distance between the axis of the push rods 24 and the pivot pins 21 of the bearing members 20 is varied, whereby the leverage is modified, so that there corresponds to a given amplitude of the displacements of the members 20 a variable and adjustable amplitude of the displacements of the sleeve 25.

Finally, the ring 22 is screwthreaded and screwed into an externally knurled ring 28 disposed between the frame 10 and the control hand wheel 26. By screwing the ring 28 to a greater or smaller extent, the ring 22 and the bearing members 20 are axially displaced and the mean position from which the axial movements of the sleeve 25 take place is thus modified.

By way of example, the series of electromagnets 16'a to 16'e and the common winding 17 may be omitted and replaced by springs tending to maintain the levers 7 in a stable position corresponding to that in which they are situated when they are held fast by the said electromagnets. It will then be sufficient for the electromagnets to be sufficiently powerful to be able to attract the studs 14, and consequently to lock the levers 6 against the action of the said springs.

What I claim is:

1. Apparatus for converting digital pulses into corresponding mechanical displacements, comprising a shaft, a series of elements rotatable and axially slidable with respect to each other on said shaft and so including cams on their ends that when any of said elements in said series is rotated from one extreme angular position to another extreme angular position relative to another of said elements, the distance between the end elements of the series is varied, means for biasing the elements in said series axially toward each other on said shaft, drive means for rotating said elements back and forth on said shaft between said angular positions, and digital pulse responsive means for selecting which of the extreme angular positions said elements in the series will be driven to by said drive means and controlling said drive means in favor of maintaining said elements in the extreme angular positions selected.

2. Apparatus for converting digital signals into corresponding mechanical displacements, comprising a shaft, a series of elements rotatable and axially slidable with respect to each other on said shaft and so including cams on their ends that when any of said elements in said series is rotated from one extreme angular position to another extreme angular position relative to another of said elements the distance between the end elements of the series is mechanically varied, means for biasing the elements in said series axially toward each other on said shaft, opposed rocking levers pivotally mounted on said shaft and forming pairs, said pairs corresponding to the elements in said series of elements, one of the rocking levers in each of said pairs being adapted to rotate a corresponding one of said series of elements to one extreme angular position on said shaft and the other of said rocking levers in the pair being adapted to rotate said corresponding one of said series of elements in an opposite direction on said shaft to another extreme angular position, drive means for rotating said elements back and forth between their extreme angular positions of rotation by force applied to said rocking levers, and digital signal responsive means for selecting which of the rocking levers in the pairs of rocking levers will be driven and accordingly determining the extreme angular positions to which said elements in the series of elements will be driven by said drive means.

3. In an apparatus for converting digital signals into corresponding mechanical displacements, with power amplification, a rotative drive shaft having an eccentric portion, a series of double-armed levers each pivotally supported on said eccentric portion of the shaft, a second shaft, a series of pairs of rocking levers pivotally mounted on said second shaft, links connecting the ends of said rocking levers to said double-armed levers in such a way that each pair of said rocking levers is controlled by one of said double-armed levers, a series of drum-type cams disposed one against the other on said second shaft in such manner as to be axially and angularly movable relative to each other, a fixed abutment for the first cam of said series, one of the rocking levers in each of said pairs being adapted to rotate a corresponding one of the elements of the series of elements to an extreme angular position on said second shaft and the other of said rocking levers in the pair being adapted to rotate said one of the elements in an opposite direction on said second shaft to another extreme angular position, the whole arrangement being such that the angular displacements of said cams, produced for each of them by a pair of the rocking levers, are converted into axial displacements which, when transmitted to the last cam of the series, have been added together in accordance with a binary arithmetical system, and electromagnets controlled by the said digital signals and arranged to hold and release said rocking levers in such manner that at least one of the rocking levers of each pair remains free for the corresponding element of the series of elements to be rotated to the corresponding extreme angular position of the element.

4. Apparatus as claimed in claim 2, in which each rotatable element of said series of elements has a radial recess affording passage to the ends of the corresponding pair of rocking levers pivotally on said shaft.

5. In an apparatus for converting digital signals into corresponding mechanical displacements, with power amplification, a rotative drive shaft having an eccentric portion, a series of double-armed levers pivotally mounted on said eccentric portion of the shaft, a second shaft, a series of pairs of rocking levers pivotally mounted on said second shaft, links connecting the ends of said rocking levers to the said double-armed levers in such a way that each pair of said rocking levers is controlled by one of said double-armed levers, a series of drum-type cams disposed one against the other on said second shaft in such a manner as to be axially and angularly movable relative to each other, a resilient device maintaining said cams one against the other, a fixed abutment for the first cam of said series, one of the rocking levers in each of said pairs being adapted to rotate a corresponding one of the elements of said series of elements to an extreme angular position on said second shaft and the other of said rocking levers in the pair being adapted to rotate said one of the elements in an opposite direction on said second shaft to another extreme angular position, the whole arrangement being such that the angular displacements of said cams, produced for each of them by a pair of the rocking levers, are converted into axial displacements which, when transmitted to the last cam of said series, have been added together in accordance with a binary arithmetical system, and electromagnets controlled by said digital signals and arranged to hold and release said rocking levers in such manner that at least one of the rocking levers of each pair remains free for the corresponding element of the series of elements to be rotated to the corresponding extreme angular position of the element.

6. In an apparatus for converting digital signals into corresponding mechanical displacements, with power amplification, a rotative drive shaft having an eccentric portion, a series of double-armed levers pivotally supported on said eccentric portion of the shaft, a second shaft, links connecting the ends of said rocking levers to said double-armed levers in such a way that each pair of said rocking levers is controlled by one of said double-armed levers, a series of drum-type cams disposed one against the other on said second shaft in such manner as to be axially and angularly movable relative to each other, a fixed abutment for the first cam of said series, one of the rocking levers in each of said pairs being adapted to rotate a corresponding one of the elements of said series of elements to an extreme angular position on said second shaft and the other of said rocking levers in the pair being adapted to rotate said one of the elements in an opposite direction on said second shaft to another extreme angular position, the whole arrangement being such that the angular displacements of said cams, produced for each of them by the corresponding pair of rocking levers, are converted into axial displacements which, when transmitted to the last cam of the series, have been added together in accordance with a binary arithmetical system, electromagnets controlled by said digital signals and arranged to hold and release said rocking levers in such manner that at least one of the rocking levers of each pair remains free for the corresponding element of the series of elements to be rotated to the extreme angular position of the element, and an adjustable mechanism to which are transmitted the axial displacements of said last cam of the series in such manner that there correspond to given displacements of said last cam, displacements of adjusted amplitude at the output of said mechanism.

References Cited in the file of this patent

UNITED STATES PATENTS

| | | |
|---|---|---|
| 1,938,899 | Gilman | Dec. 12, 1933 |
| 2,476,673 | May et al. | July 19, 1949 |
| 2,676,289 | Wulfsberg et al. | Apr. 20, 1954 |
| 2,796,566 | Maynard et al. | June 18, 1957 |
| 2,814,006 | Wilde | Nov. 19, 1957 |